(12) United States Patent
Qiao et al.

(10) Patent No.: US 11,388,329 B1
(45) Date of Patent: Jul. 12, 2022

(54) ELECTRONIC DEVICES HAVING DISPLAYS WITH IMAGE TRANSPORT LAYERS

(71) Applicant: Apple Inc., Cupertino, CA (US)

(72) Inventors: Yi Qiao, San Jose, CA (US); Michael J. Brown, Campbell, CA (US); Jean-Pierre S. Guillou, Los Gatos, CA (US); Tyler R. Kakuda, Stockton, CA (US); Hao Dong, Santa Clara, CA (US); Ying-Chih Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 313 days.

(21) Appl. No.: 16/376,961

(22) Filed: Apr. 5, 2019

Related U.S. Application Data

(60) Provisional application No. 62/699,433, filed on Jul. 17, 2018.

(51) Int. Cl.
*G02B 6/08* (2006.01)
*H04N 5/232* (2006.01)

(52) U.S. Cl.
CPC ......... *H04N 5/23216* (2013.01); *G02B 6/08* (2013.01); *H04N 5/23229* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 28,341 | A | 5/1860 | Bennett |
| 4,349,817 | A | 9/1982 | Hoffman et al. |
| 4,534,813 | A | 8/1985 | Williamson et al. |
| 5,329,386 | A | 7/1994 | Birecki et al. |
| 5,502,457 | A | 3/1996 | Sakai et al. |
| 5,659,378 | A | 8/1997 | Gessel |
| 6,046,730 | A | 4/2000 | Bowen et al. |
| 6,407,785 | B1 | 6/2002 | Yamazaki |
| 6,467,922 | B1 | 10/2002 | Blanc et al. |
| 6,680,761 | B1 | 1/2004 | Greene et al. |
| 6,845,190 | B1 | 1/2005 | Smithwick et al. |
| 7,228,051 | B2 | 6/2007 | Cok et al. |
| 7,542,209 | B2 | 6/2009 | McGuire, Jr. |

(Continued)

FOREIGN PATENT DOCUMENTS

KR  20180034832 A  4/2018

*Primary Examiner* — Chad H Smith
(74) *Attorney, Agent, or Firm* — Treyz Law Group, P.C.; Joseph F. Guihan; David K. Cole

(57) ABSTRACT

An electronic device may have a display panel for displaying images. A display cover layer having curved portions may overlap the display panel. An image transport layer having an input surface that receives light from the display panel may convey the light from the input surface to an output surface adjacent to an inner surface of the display cover layer. The image transport layer may include fibers with different lengths to form a region of the output surface with a curved profile. Each fiber in the coherent fiber bundle may have a respective output face. The output face of each fiber in the curved edge region of the image transport layer may be parallel to the display panel or may be angled towards the center of the image transport layer. Image distortion control circuitry may modify image data to control the perceived distortion of the display.

19 Claims, 13 Drawing Sheets

(56) References Cited

U.S. PATENT DOCUMENTS

| | | |
|---|---|---|
| 7,823,309 B2 | 11/2010 | Albenda |
| 7,856,161 B2 | 12/2010 | Tabor |
| 8,045,270 B2 | 10/2011 | Shin et al. |
| 8,723,824 B2 | 5/2014 | Myers et al. |
| 8,824,779 B1 | 9/2014 | Smyth |
| 8,976,324 B2 | 3/2015 | Yang et al. |
| 9,268,068 B2 | 2/2016 | Lee |
| 9,312,517 B2 | 4/2016 | Drzaic et al. |
| 9,342,105 B2 | 5/2016 | Choi et al. |
| 9,509,939 B2 | 11/2016 | Henion et al. |
| 9,591,765 B2 | 3/2017 | Kim et al. |
| 9,755,004 B2 | 9/2017 | Shieh et al. |
| 9,818,725 B2 | 11/2017 | Bower et al. |
| 9,907,193 B2 | 2/2018 | Lee et al. |
| 10,048,532 B2 | 8/2018 | Powell et al. |
| 10,052,831 B2 | 8/2018 | Welker et al. |
| 2006/0016448 A1 | 1/2006 | Ho |
| 2007/0070859 A1* | 3/2007 | Hirayama ............ G02B 5/32 369/112.04 |
| 2007/0097108 A1 | 5/2007 | Brewer |
| 2008/0144174 A1 | 6/2008 | Lucente et al. |
| 2008/0186252 A1 | 8/2008 | Li |
| 2010/0177261 A1 | 7/2010 | Jin et al. |
| 2010/0238090 A1 | 9/2010 | Pomerantz et al. |
| 2011/0025594 A1* | 2/2011 | Watanabe ........ G02F 1/13336 345/102 |
| 2011/0057861 A1 | 3/2011 | Cok et al. |
| 2011/0102300 A1 | 5/2011 | Wood et al. |
| 2011/0242686 A1 | 10/2011 | Wantanbe |
| 2012/0218219 A1 | 8/2012 | Rappoport et al. |
| 2013/0081756 A1 | 4/2013 | Franklin et al. |
| 2013/0083080 A1 | 4/2013 | Rappoport et al. |
| 2013/0235560 A1 | 9/2013 | Etienne et al. |
| 2013/0279088 A1 | 10/2013 | Raff et al. |
| 2014/0037257 A1 | 2/2014 | Yang et al. |
| 2014/0092028 A1 | 4/2014 | Prest et al. |
| 2014/0092346 A1 | 4/2014 | Yang et al. |
| 2014/0183473 A1 | 7/2014 | Lee et al. |
| 2014/0240985 A1 | 8/2014 | Kim et al. |
| 2014/0328041 A1 | 11/2014 | Rothkopf et al. |
| 2014/0354920 A1 | 12/2014 | Jang et al. |
| 2014/0362348 A1* | 12/2014 | Joseph ................ G02B 6/08 353/28 |
| 2015/0093087 A1 | 4/2015 | Wu |
| 2015/0227227 A1 | 8/2015 | Myers et al. |
| 2015/0286457 A1* | 10/2015 | Kim .................. G06F 3/1446 345/581 |
| 2016/0231784 A1 | 8/2016 | Yu et al. |
| 2016/0234362 A1 | 8/2016 | Moon et al. |
| 2017/0235341 A1 | 8/2017 | Huitema et al. |
| 2018/0052312 A1 | 2/2018 | Jia et al. |
| 2018/0088416 A1 | 3/2018 | Jiang et al. |
| 2018/0372958 A1 | 12/2018 | Karafin et al. |

\* cited by examiner

ELECTRONIC DEVICES HAVING DISPLAYS WITH IMAGE TRANSPORT LAYERS

This application claims the benefit of provisional patent application No. 62/699,433, filed Jul. 17, 2018, which is hereby incorporated by reference herein in its entirety.

FIELD

This relates generally to electronic devices, and, more particularly, to electronic devices with displays.

BACKGROUND

Electronic devices such as cellular telephones, tablet computers, and other electronic equipment may include displays for presenting images to a user.

If care is not taken, electronic devices with displays may not have a desired appearance or may be difficult to use satisfactorily. For example, displays may be bulky and unattractive or may distort images.

SUMMARY

An electronic device may have a display panel for displaying images. The display panel may include an array of organic light-emitting diode pixels. A display cover layer may overlap the display panel. Portions of the surface of the display cover layer may have curved profiles.

An image transport layer may be included in the electronic device. The image transport layer may have an input surface that receives light from the array of pixels. The light from the array of pixels may be conveyed from the input surface to an output surface. The output surface may be adjacent to an inner surface of the display cover layer.

The image transport layer may be formed from a coherent fiber bundle or a layer of Anderson localization material. The coherent fiber bundle may include fibers with different lengths to form a region of the output surface with a curved profile. The curved profile of the output surface of the image transport layer may have the same curvature as the inner surface of the display cover layer or may have different curvature than the inner surface of the display cover layer.

Each fiber in the coherent fiber bundle may have a respective output face. The output face of each fiber in the curved edge region of the image transport layer may be parallel to the display panel. Alternatively, the output face of each fiber in the curved edge region of the image transport layer may be angled towards the center of the image transport layer. Diffusive material may be interposed between the display cover layer and the image transport layer to increase the viewing angle of the display. An adjustable opacity layer may be interposed between the display cover layer and the image transport layer to reduce ambient light reflections.

In order to control the perceived distortion of the display by a viewer, the display pixel data may be selectively modified. Before being provided to display driver circuitry, the image data may be modified by image distortion control circuitry. Each frame of image data may include a representative brightness value for each pixel. The image distortion control circuitry may modify the brightness value for each pixel based on a desired perceived distortion by the viewer and based on sensor data. The modified image data may then be provided to the display driver circuitry.

DETAILED DESCRIPTION

Electronic devices may be provided with displays. The displays may have planar surfaces and curved surfaces. For example, a display may have a planar central portion surrounded by bent edges. The bent edges may have curved surface profiles. Arrangements in which displays exhibit compound curvature may also be used. Electronic devices having displays with curved surfaces may have an attractive appearance, may allow the displays to be viewed from a variety of different angles, and may include displays with a borderless or nearly borderless configuration.

Figure 1:
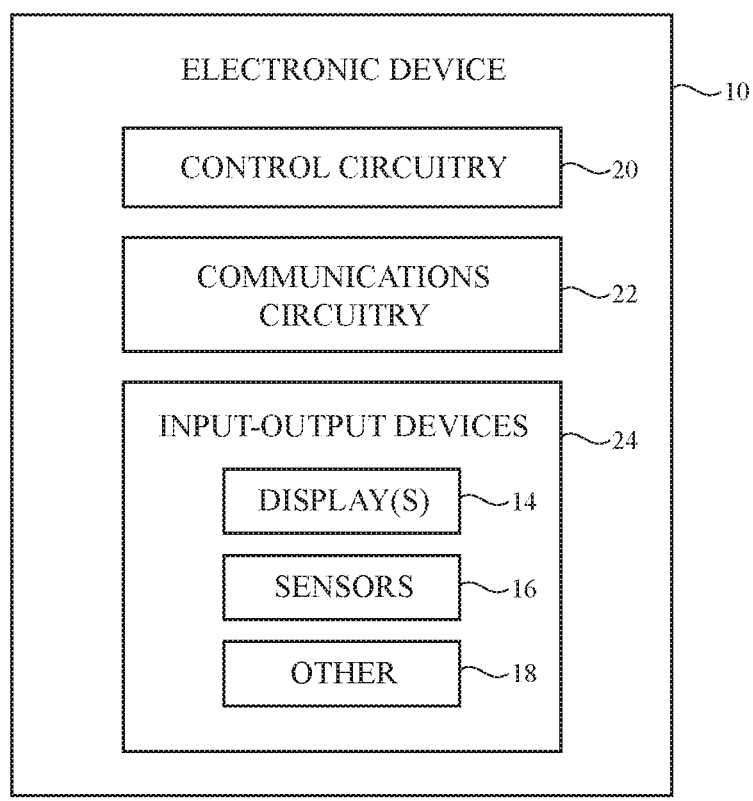
FIG. 1 is a schematic diagram of an illustrative electronic device in accordance with an embodiment.

A schematic diagram of an illustrative electronic device having a display is shown in FIG. 1. Device 10 may be a cellular telephone, tablet computer, laptop computer, wristwatch device or other wearable device, a television, a stand-alone computer display or other monitor, a computer display with an embedded computer (e.g., a desktop computer), a system embedded in a vehicle, kiosk, or other embedded electronic device, a media player, or other electronic equipment.

Device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment over a wireless link (e.g., circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Display 14 may have an array of pixels configured to display images for a user. The display pixels may be formed on a substrate such as a flexible substrate (e.g., display 14 may be formed from a flexible display panel). Conductive electrodes for a capacitive touch sensor in display 14 and/or an array of indium tin oxide electrodes or other transparent conductive electrodes overlapping display 14 may be used to form a two-dimensional capacitive touch sensor for display 14 (e.g., display 14 may be a touch sensitive display).

Sensors 16 in input-output devices 24 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors. In some arrangements, device 10 may use sensors 16 and/or other input-output devices to gather user input (e.g., buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.).

If desired, electronic device 10 may include additional components (see, e.g., other devices 18 in input-output devices 24). The additional components may include haptic output devices, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 2:
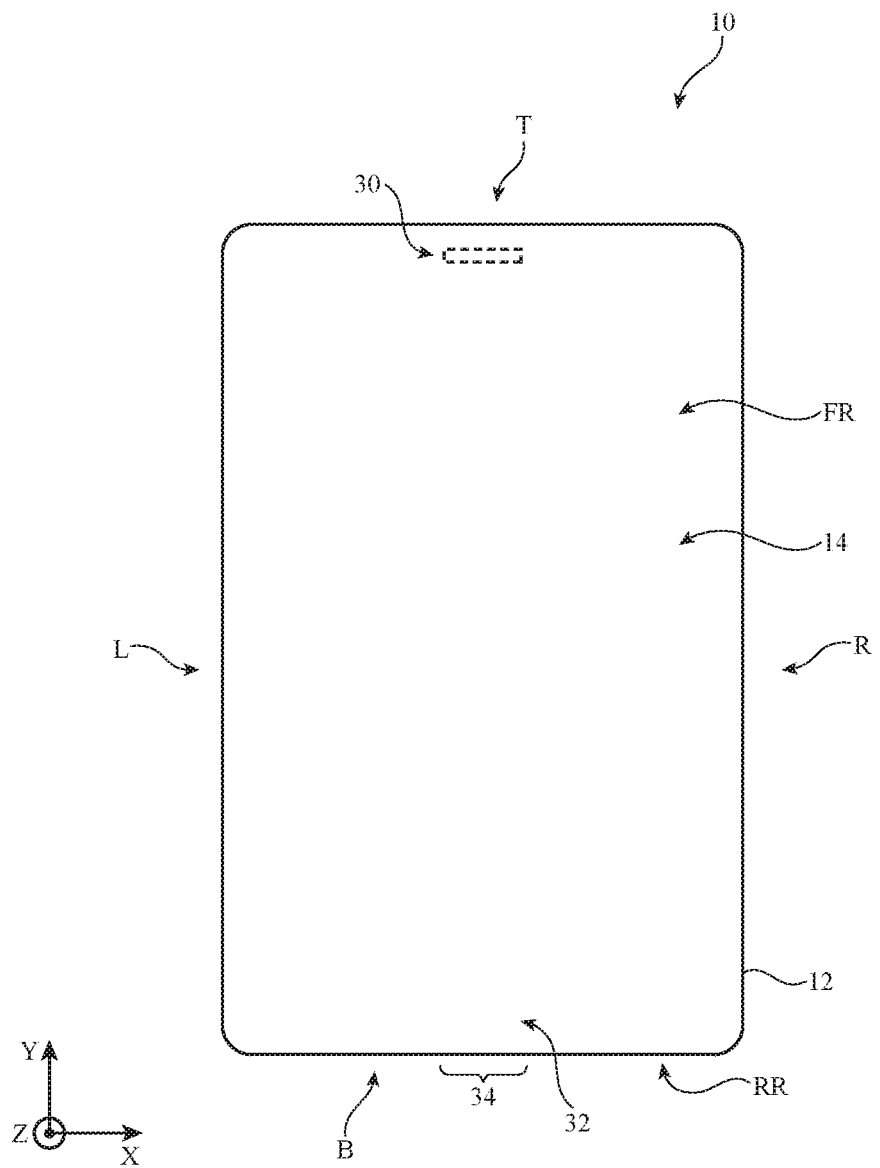
FIG. 2 is a top view of an illustrative electronic device in accordance with an embodiment.

FIG. 2 is a front (plan) view of electronic device 10 in an illustrative configuration in which display 14 covers some or all of the front face FR of device 10. Opposing rear face RR of device 10 may be covered by a housing wall formed from glass, metal, polymer, and/or other materials. Rear face RR may be free of display pixels and/or may be partly or fully covered by display 14.

Device 10 may include a housing (e.g., housing 12) that forms sidewall structures for device 10 and/or internal supporting structures (e.g., a frame, midplate member, etc.). In some illustrative arrangements, sidewall portions of device 10 may be covered with portions of display 14. In the example of FIG. 2, device 10 is characterized by four peripheral edges: upper edge T, lower edge B, left edge L, and right edge R. Upper edge T and opposing lower edge B may run parallel to each other and parallel to the X axis of FIG. 2. Left edge L and opposing right edge R may run parallel to each other and parallel to the Y axis of FIG. 2. Front face FR and rear face RR may be planar (e.g., two parallel planes offset by a distance along the Z axis) and/or may include curved portions.

Touch sensor circuitry such as two-dimensional capacitive touch sensor circuitry may be incorporated into one or more display panels in device 10 as separate touch sensor panels overlapping display pixels or may be formed as part of one or more display panels in device 10. Touch sensors may be formed on front face FR, rear face RR, and/or edges (sidewall faces) T, B, R, and/or L. If desired, icons and other images for virtual buttons may be displayed by the pixels of device. For example, virtual buttons and/or other images may be displayed on front face FR, rear face RR, and/or edges T, B, R, and/or L and may overlap touch sensor circuitry. Haptic output devices may be used to provide haptic feedback when virtual buttons are selected (as an example).

Device 10 of FIG. 2 has a rectangular outline with four rounded corners. If desired, device 10 may have other shapes. For example, device 10 may have a shape that folds and unfolds along a bend (folding) axis and may include a display that overlaps or that does not overlap the bend axis, may have a shape with an oval footprint or circular outline, may have a cubic shape, may have a pyramidal, cylindrical, or conical shape, or may have other suitable shapes. The configuration of FIG. 2 is illustrative.

If desired, openings may be formed in the surfaces of device 10. For example, a speaker port and optical windows for an ambient light sensor, an infrared proximity sensor, and a depth sensor may be formed in a region such as upper region 30 of front face FR. A finger print sensor, touch sensor button, force-sensitive button, or other sensor that operates through display 14 may be formed under the portion of display in lower region 32 on front face FR and/or other portions of front face FR and/or other external surfaces of device 10. An optional opening for a connector (e.g., a digital data connector, analog signal connector, and/or power connector) may be formed in portion 34 of the lower sidewall of device 10 running along lower edge B. This opening may be omitted when power is received wirelessly or is received through contacts that are flush with the surface of device 10 and/or when data is transferred and received wirelessly using wireless communications circuitry in circuitry 22 or through contacts that are flush with the exterior surface of device 10.

Figure 3:
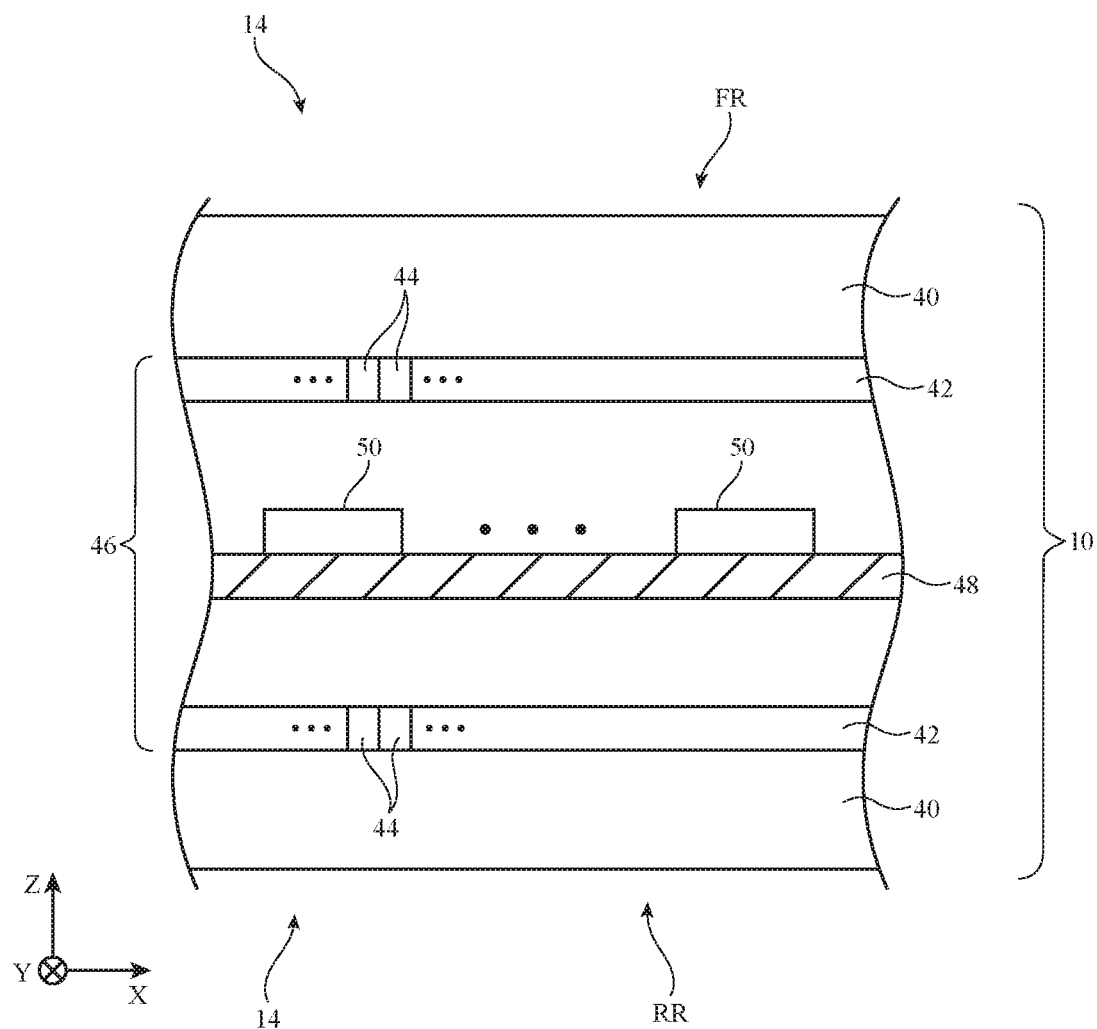
FIG. 3 is a cross-sectional side view of an illustrative electronic device in accordance with an embodiment.

FIG. 3 is a cross-sectional side view of an illustrative electronic device. As shown in FIG. 3, display 14 may be formed on front face FR and/or rear face RR of device 10. Display 14 may include one or more transparent protective layers such as display cover layers 40. Display cover layers 40 may be formed from transparent material such as clear glass, polymer, sapphire or other crystalline material, or other transparent material. Display layers such as layers 42 may have arrays of pixels 44 that form images. The pixel arrays (e.g., layers 42) may sometimes be referred to as pixel layers, pixel array layers, displays, display structures, display layers, or display panels. For example, layers 42 may be formed from organic light-emitting diode displays. In the example of FIG. 3, device 10 has a first display 14 (or first display portion of a display panel) formed from a first pixel array 42 on front face FR. This first pixel array is visible in the −Z direction through display cover layer 40 on front face FR. Device 10 of FIG. 3 also has a second display 14 (or second display portion of the display panel) formed from a second pixel array 42 on rear face RF. This second pixel array is visible in the +Z direction through display cover layer 40 on rear face RR. The front and/or rear surfaces formed by display cover layer(s) 40 may be planar (as shown in FIG. 3) or may have a curved profile.

If desired, the second display 14 of device 10 may be omitted. For example, pixel array 42 on rear face RR may be omitted. In this configuration, the inner surface of layer 40 on rear face RR may be coated with a black masking material or other opaque coating and/or may be coated with colored and/or shiny structures. Coating material can be patterned to form logos, text, and other visual elements. This type of arrangement may be used to hide internal components in interior 46 of device from view from the exterior of device 10. As shown in FIG. 3, for example, device 10 may include electrical components 50 in interior 46 (e.g., integrated circuits, sensors and other input-output devices, control circuitry, display layers 42 such as organic light-emitting diode panels or other display layers, etc.). Electrical components 50 may, if desired, be mounted on printed circuits such as printed circuit 48 (e.g., flexible printed circuits and/or printed circuits formed from rigid printed circuit board material). In configurations such as these in which the lower pixel array of device 10 is omitted, the portion of device 10 on rear face RR (e.g., layer 40) may be formed from metal (e.g., a stainless steel or aluminum layer). For example, device 10 may have a rear housing wall formed from metal. Device 10 may also have housing walls formed from opaque glass, transparent glass coated with opaque materials such as ink or metal, and/or other housing wall materials.

In some configurations for device 10, an opaque material such as metal or opaque polymer may form some or all of the sidewalls of device 10. As an example, metal that forms some or all of a rear housing wall on rear face RR of device 10 may protrude upwardly along the edges of device 10 to form some or all of the sidewalls for device 10. As another example, a peripheral metal band that forms some or all of the sidewalls of device 10 may extend around the rectangular periphery of device 10 (e.g., along upper edge T, right edge R, lower edge B, and left edge L). Sidewalls may have vertically extending planar surfaces and/or may exhibit other surface profiles (e.g., curved profiles).

If desired, some or all of the sidewalls of device 10 may be formed from clear material and may overlap light-producing components. This material may, as an example, be part of display cover layers 40 of FIG. 3 (e.g., an extending piece of glass, polymer, crystalline material, etc.). Because clear layers of glass, plastic, crystalline material, and/or other clear layers of material in device 10 may enclose and protect internal device components, these outer layers of material in device 10 serve as an enclosure (housing 12) for device 10.

In configurations for device 10 in which sidewalls have transparent portions formed from extending portions of display cover layers 40 or other transparent material, the sidewalls may overlap light-emitting components. Transparent sidewalls may have planar and/or curved surfaces and may be formed from clear glass, clear polymer, transparent crystalline material such as sapphire, and/or other transparent protective material. Displays (pixel arrays), light-emitting diodes covered with diffusing material, light-emitting diodes covered with patterned masks (e.g., opaque coatings with icon-shaped openings or openings of other shapes), and/or other light-emitting devices may be placed under clear sidewalls.

During operation, light emitted from the pixels or other light-emitting components under the sidewalls may pass through the sidewalls. In arrangements in which display panels are placed under transparent sidewalls, images may be displayed through the sidewalls. The images may form parts of images being displayed on front face FR and/or rear face RR and/or may be separate images. For example, a photograph may extend across front face FR and some or all of the sidewalls of device 10 and/or a photograph may cover only front face FR while virtual buttons are displayed on the sidewalls of device 10. In arrangements in which one or more light-emitting diodes and an overlapping diffuser are placed under transparent sidewalls, diffuse light may be emitted through the sidewalls.

In addition to optional opaque housing structures such as metal housing walls or opaque walls formed from other materials, device 10 may include display cover layers 40 and other structures formed from transparent glass, transparent polymer, and/or other transparent material. These materials may surround the interior of device 10 and thereby serve as a housing for device 10 as well as serving as protective layers for pixel arrays and other light-emitting components. In the example of FIG. 3, the front surface of device 10 is formed by a planar surface of display cover layer 40 on front face FR and the rear surface of device 10 is formed by a planar surface of display cover layer 40 on rear face RR. In general, device 10 may have planar surface portions and/or curved surface portions (surface portions with curved profiles) and these portions may be formed by display cover layers, other layers formed from glass, polymer, sapphire or other crystalline material, ceramic, or other potentially transparent materials, metal, wood, or other materials.

Figure 4:
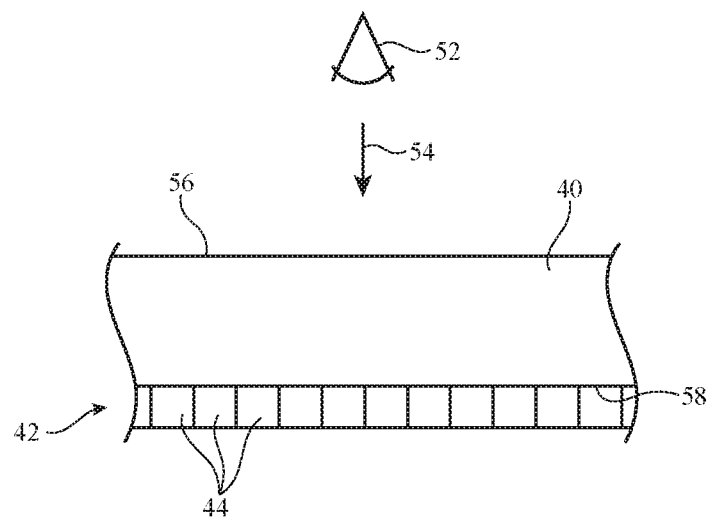
FIG. 4 is a cross-sectional side view of an illustrative planar portion of a display cover layer and pixel array in accordance with an embodiment.
Figure 5:
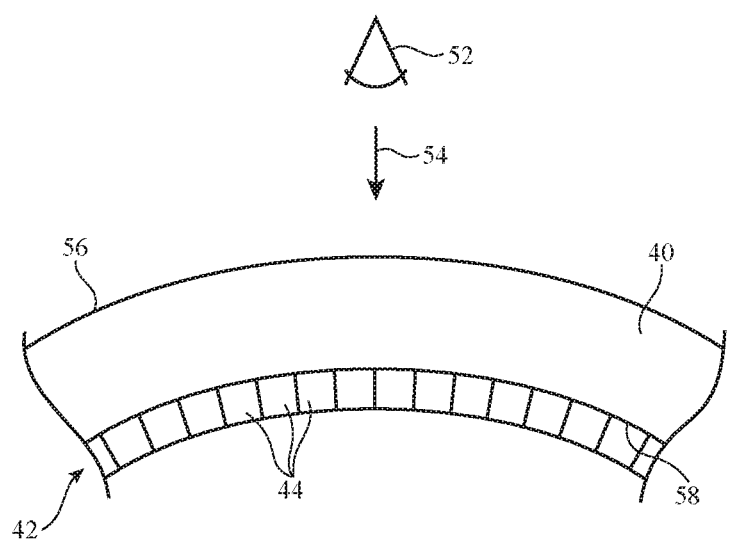
FIG. 5 is a cross-sectional side view of an illustrative curved portion of a display cover layer and pixel array in accordance with an embodiment.

Transparent portions of device 10 may overlap pixels or other light-emitting components that emit light that is visible to a user. In the illustrative arrangements of FIGS. 4 and 5, an array of pixels 44 in layer 42 is configured to emit light that passes through display cover layer 40 for viewing by viewer 52 (e.g., in direction 54 and/or other directions from the exterior of device 10). The inner and outer surface of layers 40 (and other layers enclosing the interior of device 10) may be planar and/or curved. In the illustrative configuration of FIG. 4, outer surface 56 of layer 40 and inner surface 58 of layer 40 are planar. Inner surface 58 of FIG. 4 may be curved or partly planar and partly curved, if desired. In the illustrative configuration of FIG. 5, outer surface 56 of layer 40 is curved and inner surface 58 of layer 40 is curved. Inner surface 58 may, if desired, be planar or may have planar and curved surface profile portions.

Figure 6:
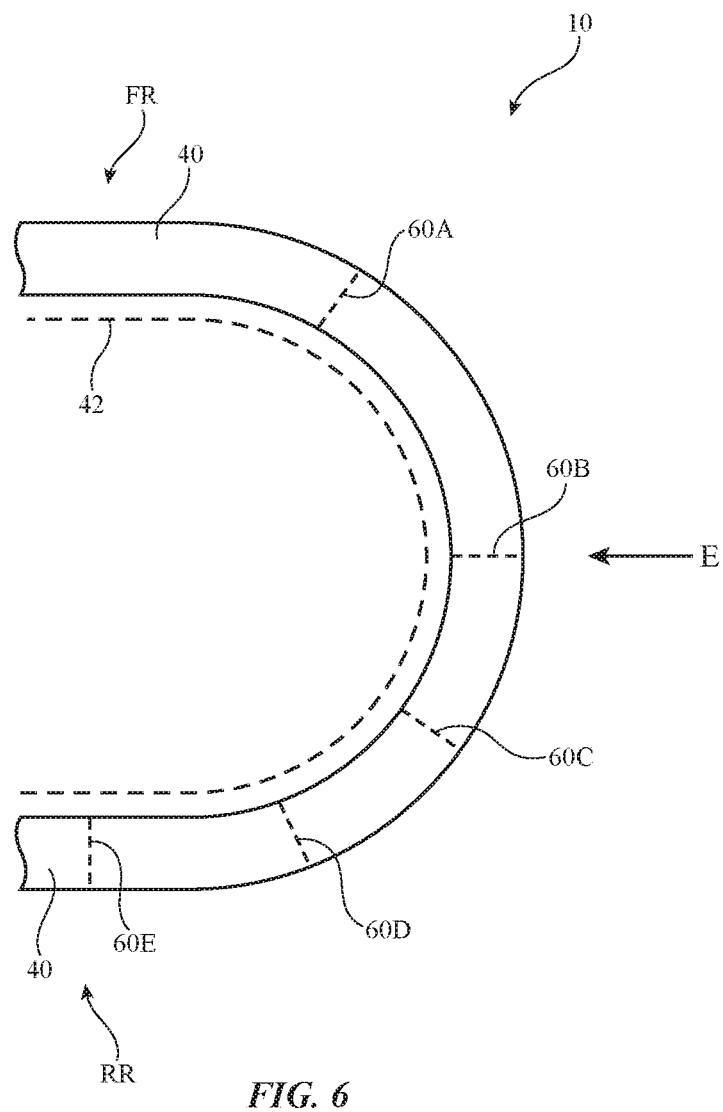
FIG. 6 is a cross-sectional side view of an illustrative sidewall portion of an electronic device in accordance with an embodiment.

Device 10 may have upper and/or lower surfaces (e.g., external surfaces 56 on front face FR and rear face RR, respectively) that are planar and/or curved. The edges of device 10 may have sidewalls with planar and/or curved portions (e.g., surfaces with straight and/or curved profiles). As shown in FIG. 6, for example, the sidewalls of device 10 along one or more edges such as edge E of device 10 (e.g., left edge L, right edge R, upper edge T, lower edge B, and/or the corners of device 10) may have a curved outer surface.

Edge E may be transparent (e.g., the entire sidewall of device 10 may be transparent and may be formed from extended portions of upper and lower display cover layers 40) and/or one or more portions of the curved sidewall of edge E may be opaque (e.g., formed from glass or other material that is coated with opaque material, formed from opaque polymer, formed from metal, and/or formed from other opaque structures). Opaque structures (e.g., metal housing wall portions) may extend along one or more portions of edge E (e.g., metal or other opaque material may form the portion of edge E between locations 60A and 60B, between locations 60B and 60C, between locations 60C and 60D, between locations 60D and 60E, between locations 60A and 60C, between locations 60B and 60D, between locations 60C and 60E, or between other suitable locations on edge E. There may be a single strip of metal housing material that runs around all four peripheral edges E of device 10, there may be a pair of discrete strips of metal housing material that run around all four peripheral edges E in parallel, there may be no non-glass structures on edges E, and/or there may be other suitable structures on edges E.

Display layer 42 may be formed from a single panel (e.g., a single flexible organic light-emitting diode display panel having a polyimide substrate or other flexible substrate with bent edge portions), may be formed from multiple panels (e.g., multiple panels separated from one or more gaps), may be formed from panels with slots and other openings, and/or may be formed from other types of displays. Portions of display layer 42 (e.g., all of layer 42 and/or the pixels and/or other structures of layer 42) may be omitted wherever layer 42 is overlapped by a metal portion of edge E and/or other opaque structures in edge E. For example, edge E may be formed from glass everywhere except between locations 60B and 60D. The portion of edge (sidewall) E between locations 60B and 60D may be formed from metal (as an example). In this type of scenario, no display layer 42 (or at least no pixels 44) may be overlapped by the metal and pixels 44 and display layer 42 may be present under the glass portions of edge E and/or display cover layer 40 on front face FR and/or rear face RR.

Figure 7:
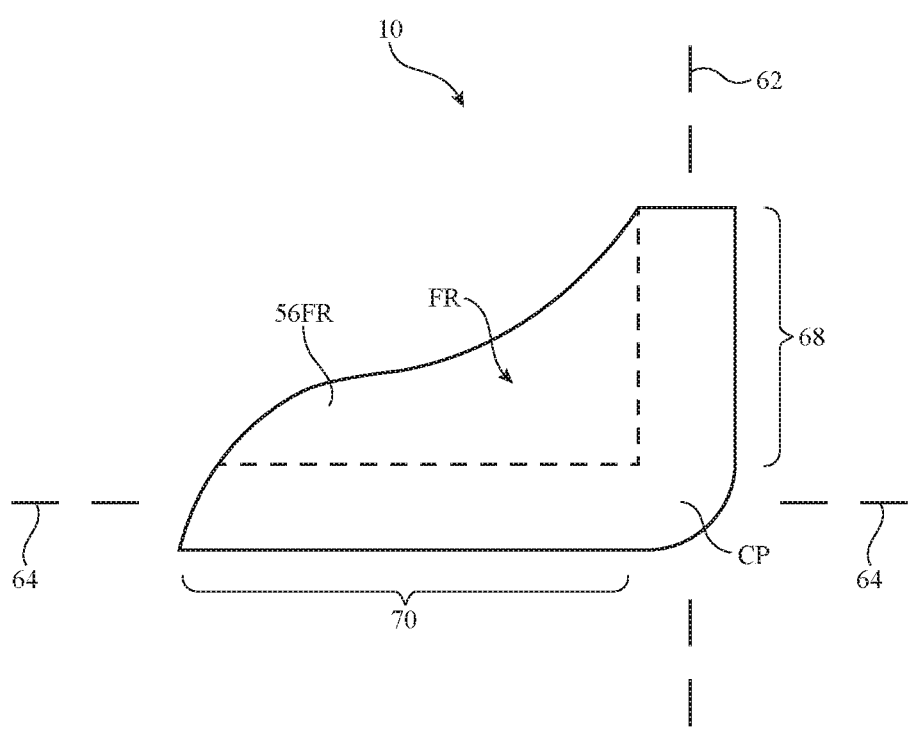
FIG. 7 is a top view of an illustrative corner portion of an electronic device in accordance with an embodiment.

If desired, device 10 may have external surfaces with compound curvature. A top view of an illustrative corner portion of device 10 is shown in FIG. 7. In the example of FIG. 7, device 10 has edge portions (sidewalls) 68 and 70 with surfaces that curve about axes 62 and 64, respectively. These portions extend along the straight sides of device 10 and are characterized by curved surfaces that can be flattened into a plane without distortion (sometimes referred to as developable surfaces). At the corner of device 10, device 10 has curved surface portions CP with compound curvature (e.g., a surface that can only be flattened into a plane with distortion, sometimes referred to as a surface with Gaussian curvature). Each of the four corners of device 10 may have this arrangement, if desired.

Flexible displays such as organic light-emitting diode displays with flexible polyimide substrates or other bendable polymer substrates can be bent about axes such as axes 62 and 64 to form curved surfaces in portions 68 and 70. In compound curvature regions such as corner regions of device 10, display 14 can be formed from materials that stretch (e.g., displays formed from mesh-shaped elastomeric substrate material), may be formed from flexible displays that are patterned to create flexible strips and other structures that can be bent to cover at least part of the compound curvature regions, and/or may use optical structures (e.g., lenses, etc.) to redirect light emitted from pixels in a display to surfaces with compound curvature.

With one illustrative arrangement, which is sometimes described herein as an example, device 10 includes one or more structures that transport image light from the surface of an array of pixels to another surface (e.g., a surface associated with the inner surface of a display cover layer or an outer surface of device 10) while preventing the light from spreading laterally and thereby preserving the integrity of the image. This allows the image produced by an array of pixels in a flat or curved display to be transferred from an input surface of a first shape at a first location to an output surface with compound curvature or other desired second shape at a second location. The image transport layer may therefore move the location of an image while changing the shape of the surface on which the image is presented. Examples of layers of material that can transfer image light in this way include coherent fiber bundles and Anderson localization material. These layers of material may sometimes be referred to herein as image transport layers or image transport structures.

Fiber bundles include fiber cores of a first refractive index surrounded by cladding (e.g., polymer binder) of a second, lower refractive index. The fiber cores may be formed from fibers of glass, polymer, or other transparent material. Core diameters may be, for example, at least 5 microns, at least 7 microns, at least 8 microns, at least 9 microns, less than 40 microns, less than 17 microns, less than 14 microns, less than 11 microns, or other suitable diameter. The fibers in a coherent fiber bundle extend parallel to each other (e.g., the fibers are longitudinally invariant along the direction of light propagation through the fiber bundle). Anderson localization material is characterized by transversely random refractive index features (higher index regions and lower index regions) of about two wavelengths in lateral size that are configured to exhibit two-dimensional transverse Anderson localization of light (e.g., the light output from the display of device 10). These refractive index variations are longitudinally invariant (e.g., along the direction of light propagation, perpendicular to the surface normal of a layer of Anderson localization material).

Fiber bundles and Anderson localization material can be formed into plates (e.g., layers with a thickness of at least 0.2 mm, at least 0.5 m, at least 1 mm, at least 2 mm, at least 5 mm, less than 20 mm, or other desired thickness). The surfaces of the plates may be planar and/or may have curved profiles. Image transport layers such as these can be used to transport an image from a first surface (e.g., the surface of a pixel array) to a second surface (e.g., a surface in device 10 with compound curvature or other curved and/or planar surface shape) without causing the image light to spread laterally. For example, an image that is produced by a display can be transported 5 mm vertically through an image transport layer that is 5 mm thick and can then be viewed on the output surface of the image transport layer. As another example, an image transport layer may have a planar input surface and an output surface with a planar central region surrounded by curved edges and corners of compound curvature. With this type of arrangement, images produced by a display that rests against the planar input surface can be smoothly transported to an output surface without becoming blurred, even if the output surface contains curved portions such as areas of compound curvature. Curved surfaces can be formed by polishing, slumping heated fiber bundle material, molding under heat and/or pressure, etc.

Figure 8:
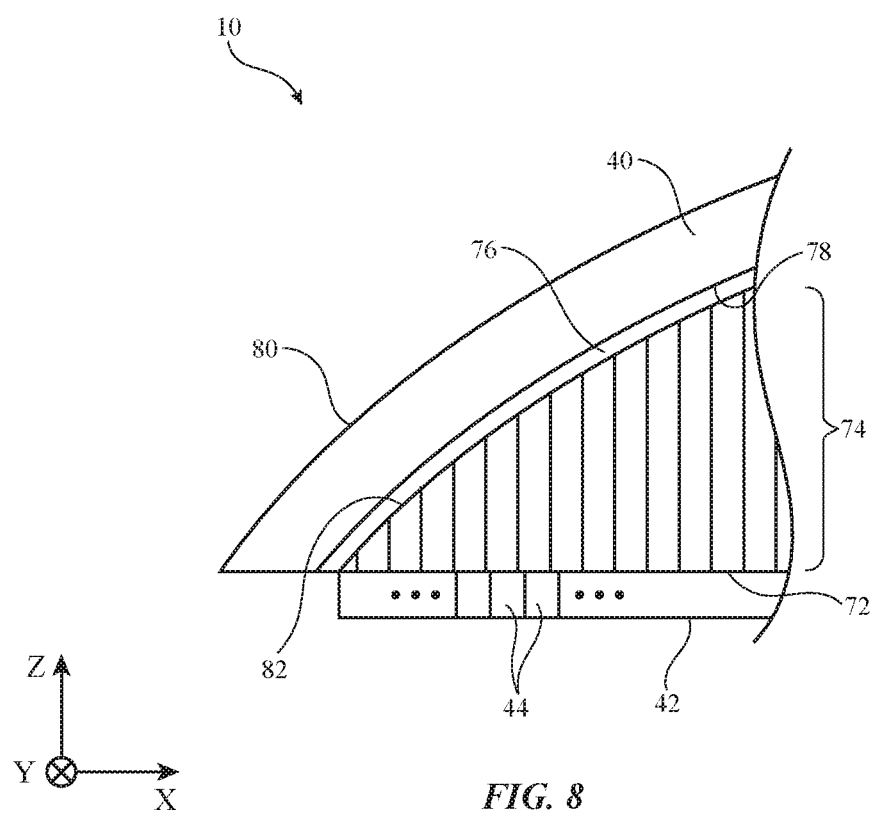
FIG. 8 is a cross-sectional side view of an edge portion of an electronic device having an image transport layer with a curved surface in accordance with an embodiment.

FIG. 8 is a cross-sectional side view of device 10 in an illustrative arrangement in which device 10 includes an image transport layer. Image transport layer 74 of FIG. 8 may be formed from a coherent fiber bundle or Anderson localization layer and may be invariant along the axis of light propagation (the Z axis in the example of FIG. 8). During operation, light emitted from pixels 44 of display layer 42 passes vertically through layer 74 from input surface 72 to output surface 82 (e.g., due to the vertically oriented fibers in the fiber bundle forming layer 74 or the longitudinally invariant refractive index features in an Anderson localization material forming layer 74). Input surface 72 may, if desired, be planar (e.g., display layer 42 and the array of pixels 44 in layer 42 may be planar) and may optionally extend across the front or rear of device 10 (e.g., across front face FR or rear face RR). Arrangements in which display layer 42, image transport layer 74, and display cover layer 40 cover some or all of the sidewalls of device 10 may also be used. The structures of FIG. 8 may, if desired, be located along a straight section of the peripheral edge of device 10 and/or along a rounded corner section of the peripheral edge of device 10. Output surface 82 may be curved (e.g., output surface 82 may exhibit a curved profile).

For example, output surface 82 may have compound curvature when image transport layer 74 is being used at a corner of device 10.

The electronic device may include one or more optional layers 76 formed over the output surface 82 of image transport layer 74. For example, to help extract light from image transport layer 74 (e.g., to enhance viewing of displayed images in the −Z direction by a user of device 10), an optional layer such as layer 76 may cover the output surface 82 of image transport layer 74. Layer 76 may have diffusive material (e.g., layer 76 may be a diffuser layer formed from polymer or glass with embedded light scattering particles, textured polymer or glass, etc.), or may include a light extraction hologram.

If desired, layer 76 may be a layer of adhesive or may include one or more layers of adhesive for attaching image transport layer 74 to optional covering structures such as display cover layer 40 or other transparent structures (sometimes referred to as transparent housing walls). For example, layer 76 may include optically clear adhesive (OCA). Layer 40 may have a thickness that varies across the surface of layer 40 and/or may have a relatively uniform thickness (e.g., portions of inner surface 78 of layer 40 and outer surface 80 of layer 40 may be separated by an amount that varies across surface 80 and/or a fixed amount). If desired, layer 40 (and, if desired, layer 76) may be omitted on some or all of the exterior of device 10 (e.g., output surface 82 may form an outer surface for device 10 or the outer surface of an inorganic material or other material in layer 76 may form an outer surface for device 10). The use of layer 40 may help protect underlying layers such as layer 76 and layer 74 from damage during use of device 10.

To help control ambient light reflections, optional layer(s) 76 may also include an adjustable opacity layer. The adjustable opacity layer may be adjusted between different opacity states. For example, in low ambient light conditions the adjustable opacity layer may have a high transparency (e.g., may transmit more than 50% of light, more than 70% of light, more than 90% of light, etc.). In high ambient light conditions, the transparency of the adjustable opacity layer may be lowered to block ambient light reflections (e.g., reflections of ambient light off of image transport layer 74). The adjustable opacity layer may be a photochromic layer (with transparency dependent upon ambient light levels), an electrochromic layer (with transparency dependent upon an applied voltage signal), or any other desired layer with an opacity that can be adjusted. For example, the adjustable opacity layer may be a photochromic layer and the transparency of the photochromic layer may automatically be adjusted in response to exposure to ambient light. In another example, the adjustable opacity layer may be an electrochromic layer and the transparency of the photochromic layer may be adjusted by control circuitry in the electronic device (e.g., control circuitry 20 in FIG. 1) based on sensor data indicating ambient light levels (e.g., data from sensors such as sensors 16 in FIG. 1).

The example of FIG. 8 of the adjustable opacity layer being interposed between the outer surface 82 of image transport layer 74 and the inner surface 78 of layer 40 is merely illustrative. If desired, the adjustable opacity layer may be formed at other desired locations within the electronic device (e.g., between the image transport layer and the display pixels). In cases where the electronic device does not include an image transport layer, an adjustable opacity layer may still be included over the display pixels for ambient light reflection control.

Textured surfaces, steps or angles formed in the fibers or other structures in layer 74, and/or other light extraction structures may also be used at the output of layer 74. For example, the angles of the output faces of fibers in image transport layer 74 may be selected to control the viewing angle of the display. FIGS. 9-12 show fibers that may be included in an image transport layer, illustrating how the angle of the output faces of the fibers may control the direction in which the output light is emitted.

Figure 9:
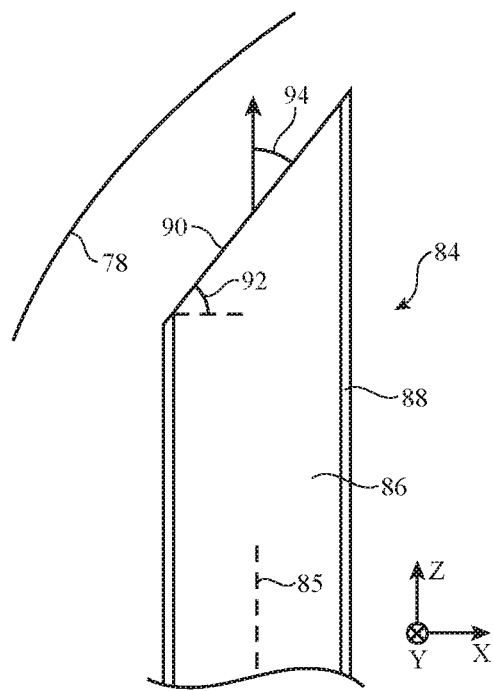
FIGS. 9-12 are cross-sectional side views of illustrative fibers having output faces with different angles that may be used to form an image transport layer in accordance with an embodiment.

As shown in FIG. 9, an illustrative fiber 84 has a core 86 surrounded by a cladding 88 (sometimes referred to as polymer binder 88). Core 86 may have a higher refractive index than cladding 88. Core 86 may be formed from glass, polymer, or other transparent material. Core 86 may have a diameter of at least 5 microns, at least 7 microns, at least 8 microns, at least 9 microns, less than 40 microns, less than 17 microns, less than 14 microns, less than 11 microns, or other suitable diameter. The core has a face 90 (sometimes referred to as output face 90) that forms a portion of outer surface 82 of the image transport layer. The fiber extends along a longitudinal axis 85.

Figure 10:
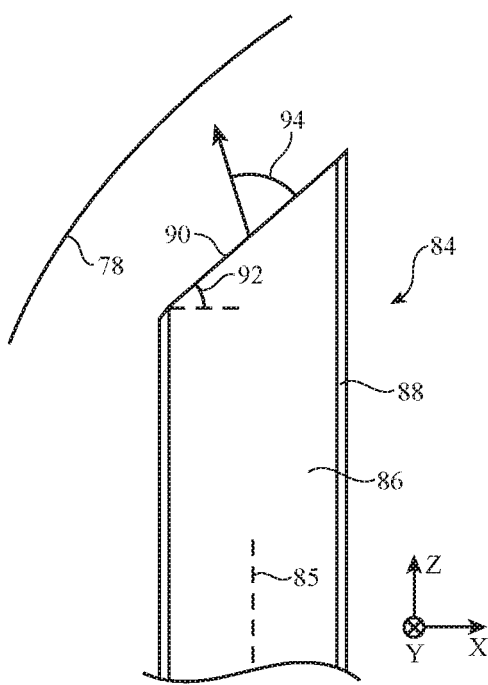

In FIG. 9, the output face 90 of fiber 84 is at an angle 92 relative to the X-axis (and display layer 42) and faces the inner surface 78 of layer 40. As previously mentioned, the angle of the output face of the fiber may determine the angle at which light is emitted from the fiber. In FIG. 9, light may be emitted to form a viewing cone with angle 94. As shown, fibers having the arrangement of FIG. 9 may emit primarily on-axis light (e.g., light emitted towards the front of the electronic device). In this type of arrangement, a viewer looking at the edge of the display (e.g., looking in the positive X-direction) may not be able to see the light emitted from fiber 84. To increase the amount of viewable off-axis light, the angle of the output face relative to the X-axis (and display layer 42) may be reduced. In the example of FIG. 10, angle 92 is less than in FIG. 9. This increases the angle 94 of the viewing cone such that more light is emitted in the negative X-direction. Thus, brightness will be increased for a viewer looking in the positive X-direction when using the fiber of FIG. 10 compared to the fiber of FIG. 9.

Figure 11:
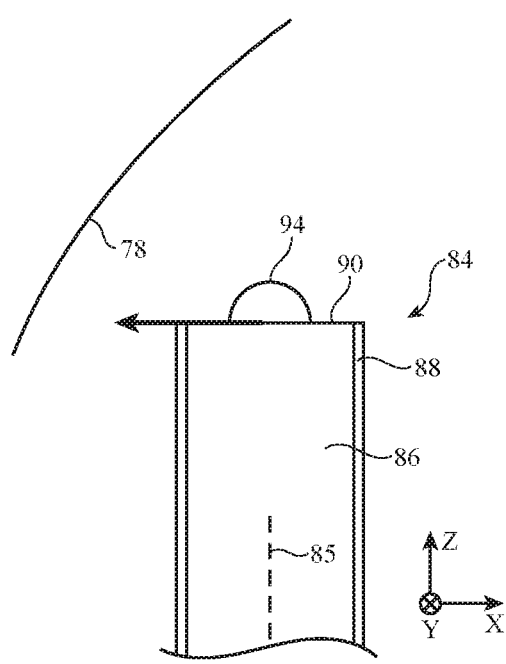
Figure 12:
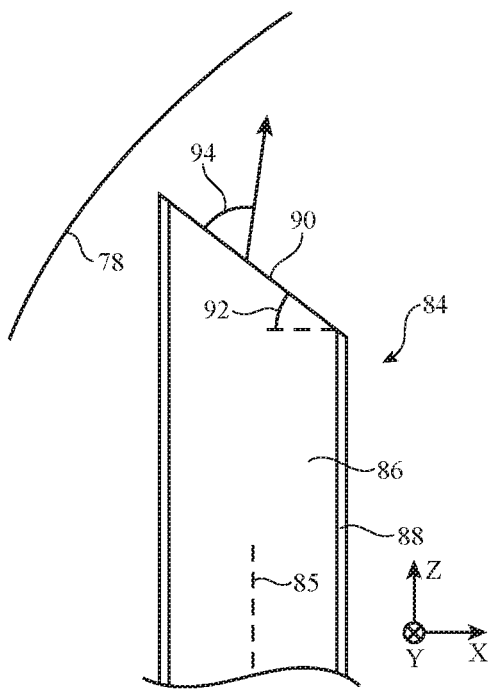

FIG. 11 shows an example where output face 90 is parallel to the X-axis (and perpendicular to longitudinal axis 85). This results in the viewing cone for fiber 84 having an angle 94 of 180°. This will increase brightness when viewing the display from the edge of the electronic device. FIG. 12 shows yet another embodiment for fiber 84 where the output face 90 of the fiber is angled away from the inner surface 78 of layer 40. In FIGS. 9 and 10, output face 90 faces inner surface 78. The fibers of FIGS. 9 and 10 are on the left edge of the electronic device (when viewed from the front). To have the output face of the fiber angled towards the inner surface of the display cover layer, the side of the fiber closer to the edge of the electronic device is shorter than the side of the fiber further from the edge of the electronic device. In FIG. 12, the side of the fiber closer to the edge of the electronic device is longer than the side of the fiber further from the edge of the electronic device. Said another way, the fibers in FIGS. 9 and 10 are positioned on the left edge of the electronic device and have output faces that are angled towards the left edge of the device, whereas the fiber in FIG. 12 is positioned on the left edge of the electronic device and is angled away from the left edge of the device. Angling the output face of the fiber away from inner surface 78 in this way results in a viewing cone that directs more light in the negative X-direction. Thus, brightness will be increased for a viewer looking in the positive X-direction when using the fiber of FIG. 12 compared to the fibers of FIGS. 9 and 10.

In one illustrative arrangement, the output face 90 may be perpendicular or nearly perpendicular (e.g., between 85° and 95°, between 80° and 100°, between 70° and 110°, etc.) to inner surface 78 (e.g., the closest portion of inner surface 78 to the output face).

Figure 13:
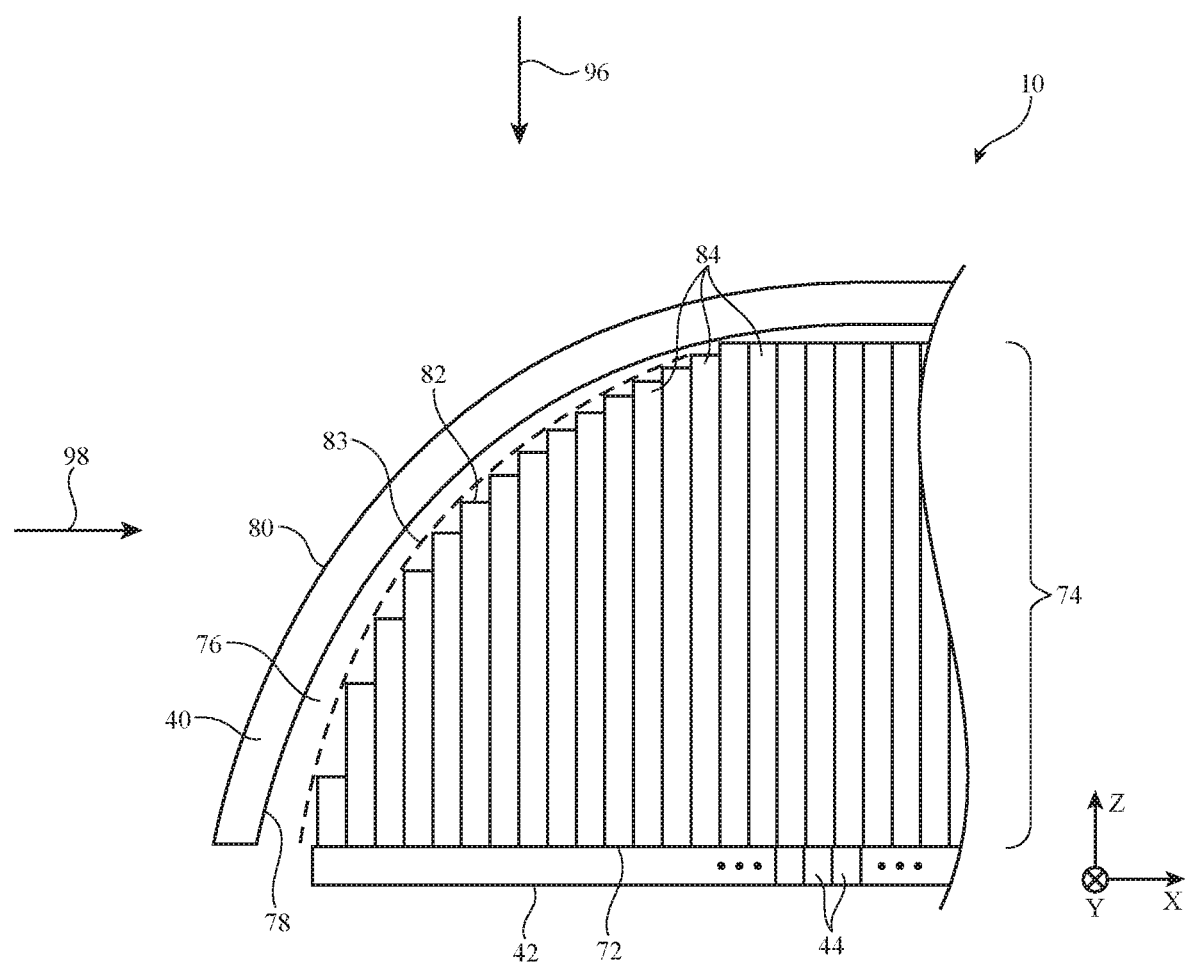
FIG. 13 is a cross-sectional side view of an edge portion of an electronic device having an image transport layer formed from a plurality of fibers that each have a flat output face that is parallel to the display panel in accordance with an embodiment.

As shown in FIGS. 9-12, the angle of output face 90 of each fiber may be used to control the off-axis viewing of the display. FIG. 13 shows a cross-sectional side view of an illustrative electronic device with an image transport layer that includes fibers of the type shown in FIG. 11. As shown in FIG. 13, image transport layer 74 may be formed from a coherent fiber bundle that includes a plurality of fibers 84 each having an output surface that is perpendicular to the longitudinal axis of the respective fiber. During operation, light emitted from pixels 44 of display layer 42 passes vertically through layer 74 from input surface 72 to output surface 82 (e.g., due to the vertically oriented fibers in the fiber bundle forming layer 74). Input surface 72 may, if desired, be planar (e.g., display panel 42 and the array of pixels 44 in display panel 42 may be planar) and may optionally extend across the front or rear of device 10 (e.g., across front face FR or rear face RR).

The structures of FIG. 13 may, if desired, be located along a straight section of the peripheral edge of device 10 and/or along a rounded corner section of the peripheral edge of device 10. Although formed from fibers with planar output faces, the output surface 82 of the image transport layer follows a curved profile 83 (sometimes referred to as a spline). For example, curved profile 83 of output surface 82 may have compound curvature when image transport layer 74 is being used at a corner of device 10. The fibers 84 in image transport layer 74 may have different lengths to approximate the curvature of curved profile 83. However, each fiber may still have an output surface that is parallel to the X-axis (and display panel 42). The curvature (e.g., the radius of curvature) of curved profile 83 may the same or different than the curvature (e.g., the radius of curvature) of the inner surface 78 of display cover layer 40.

Arranging the fibers as shown in FIG. 13 may allow for image transport layer to have an output surface 82 with a curved profile having curvature that matches the curvature of the inner surface 78 of layer 40 (or any other desired curvature). Additionally, while approximating the desired curvature the fibers may emit light with a wide viewing cone, allowing the display to be viewed from both on-axis (e.g., a viewer looking in direction 96) and off-axis (e.g., a viewer looking in direction 98) directions. The presence and type of optional layer 76 may affect the viewing cone of the fibers. The index of refraction of layer 76 affects how light is emitted from fibers 84. If air surrounds the output faces of the fibers, the arrangement of FIG. 13 may provide improved on-axis and off-axis viewing. However, in other cases a layer 76 may be included with a different refractive index than air. In these cases, it may be desirable to use fibers having different output surface shapes.

Figure 14:
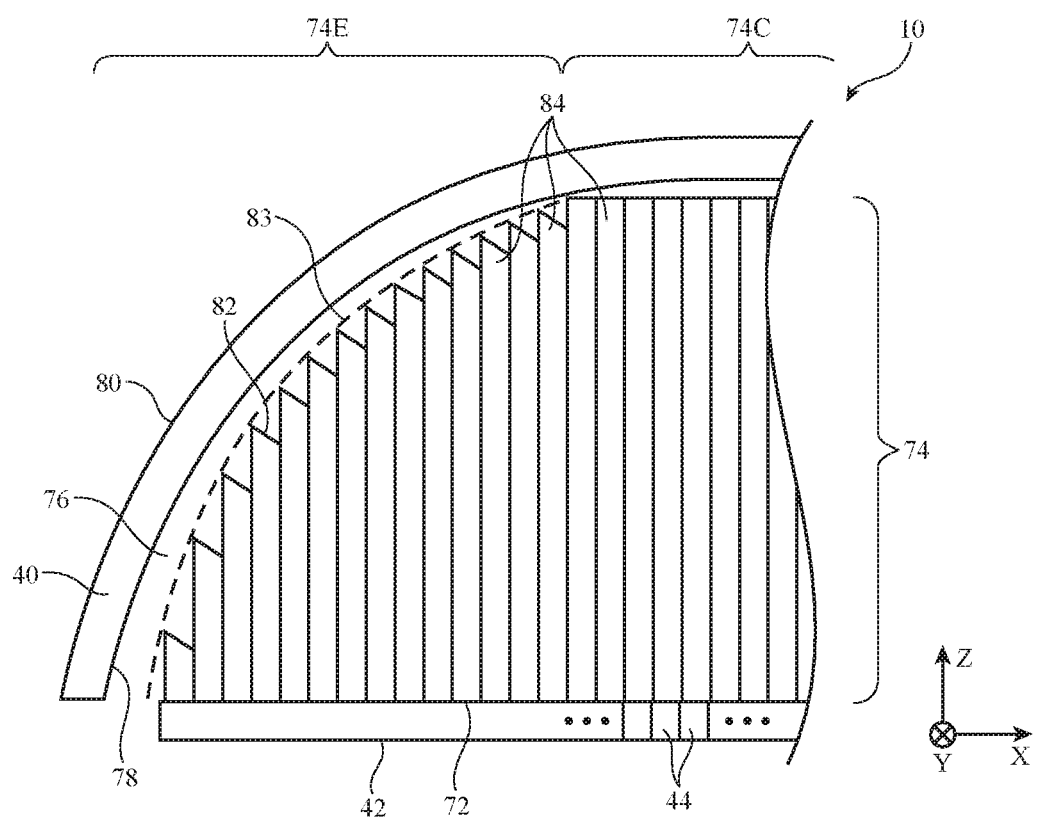
FIG. 14 is a cross-sectional side view of an edge portion of an electronic device having an image transport layer formed from a plurality of fibers that each have an output face that is angled away from the edge of the electronic device in accordance with an embodiment.

FIG. 14 shows a cross-sectional side view of an illustrative electronic device with an image transport layer that includes fibers of the type shown in FIG. 12. As shown in FIG. 14, image transport layer 74 may be formed from a coherent fiber bundle that includes a plurality of fibers 84 each having an output face that is angled away from the inner surface 78 of layer 40. During operation, light emitted from pixels 44 of display layer 42 passes vertically through layer 74 from input surface 72 to output surface 82 (e.g., due to the vertically oriented fibers in the fiber bundle forming layer 74). Input surface 72 may, if desired, be planar (e.g., display layer 42 and the array of pixels 44 in layer 42 may be planar) and may optionally extend across the front or rear of device 10 (e.g., across front face FR or rear face RR).

The structures of FIG. 14 may, if desired, be located along a straight section of the peripheral edge of device 10 and/or along a rounded corner section of the peripheral edge of device 10. Although formed from fibers with planar output faces, the output surface 82 of the image transport layer follows a curved profile 83 (sometimes referred to as a spline). For example, curved profile 83 of output surface 82 may have compound curvature when image transport layer 74 is being used at a corner of device 10. The fibers 84 in image transport layer 74 may have different lengths to approximate the curvature of curved profile 83. However, each fiber may have an output face that is angled away from inner surface 78 (e.g., fibers of the type shown in FIG. 12). The curvature (e.g., the radius of curvature) of curved profile 83 may the same or different than the curvature (e.g., the radius of curvature) of the inner surface 78 of display cover layer 40.

Arranging the fibers as shown in FIG. 14 may allow for image transport layer to have an output surface 82 with a curved profile having curvature that matches the curvature of the inner surface 78 of layer 40 (or any other desired curvature). Additionally, while approximating the desired curvature the fibers may emit light in both on-axis and off-axis directions. Each fiber 84 in an edge portion 74E of the image transport layer may have an output face that is angled away from the edge (as in FIG. 12). The fibers in a central portion 74C of the image transport layer may have output faces that are parallel to the display layer. The fibers in edge portion 74E of the image transport layer may each have an output face with the same output face angle (as shown in FIG. 14). However, this example is merely illustrative. If desired, the output face angles of each fiber in edge portion 74E of the image transport layer may vary. For example, the output face angles of each fiber may be correlated to the position of the fiber (e.g., distance from the edge of the display).

The presence and type of optional layer 76 may affect the viewing cone of the fibers. The index of refraction of layer 76 affects how light is emitted from fibers 84. If optically clear adhesive (OCA) surrounds the output faces of the fibers, the arrangement of FIG. 14 may provide improved on-axis and off-axis viewing.

The output faces of the fibers in edge portion 74E of the image transport layer being angled away from the edge of the display may sometimes be referred to as a sawtooth arrangement. In the sawtooth arrangement, the output faces of the fibers in the edge portion of the image transport layer are angled towards the central portion of the image transport layer.

In both FIGS. 13 and 14, layer 76 may have diffusive material (e.g., layer 76 may be a diffuser layer formed from polymer or glass with embedded light scattering particles, textured polymer or glass, etc.) or may include a light extraction hologram. Similarly, in both FIGS. 13 and 14, layer 76 may include an adjustable opacity layer.

In some of the embodiments described herein, an electronic device may have a display with an image transport layer that conveys light from a planar display layer to a curved output surface. For example, consider the example of FIG. 13, in which output surface 82 of image transport layer 74 has a curved profile 83. For a viewer that is viewing the display along direction 96 in FIG. 13, output surface 82 falls away from the viewer along the edge of the electronic device (meaning that portions of the output surface closer to the edge are further from the viewer than portions of the output surface closer to the center of the device). In some cases, it may be desirable for the viewer to perceive the display has falling away from the viewer. In other cases, however, it may be desirable for the viewer to perceive the display as planar. To determine how the display is perceived by the viewer, image distortion control circuitry may modify image data before the image data is displayed on the display. In this way, the warp effect in the curved edge region of the electronic device may be controlled (and changed in real time).

Figure 15:
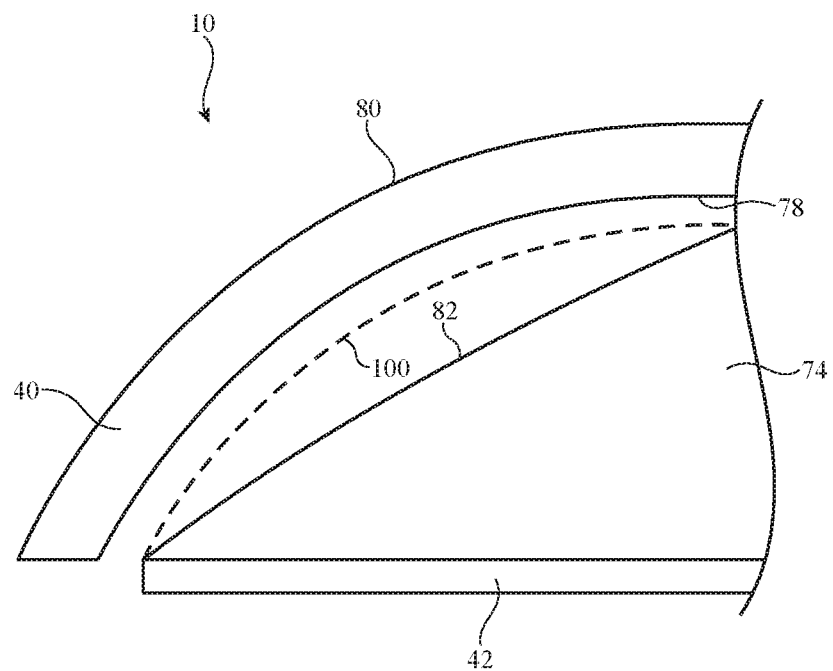
FIG. 15 is a cross-sectional side view of an edge portion of an electronic device having an image transport layer with an output surface having different curvature than the inner surface of the display cover layer in accordance with an embodiment.

FIG. 15 is a cross-sectional side view of an illustrative electronic device with an image transport layer showing how the display distortion may be controlled by control circuitry in the electronic device. As shown in FIG. 15, electronic device 10 may include a display layer 42 (with display pixels) and an image transport layer 74 that conveys light from the display pixels to an output surface 82. Image transport layer 74 may be a coherent fiber bundle or a layer of Anderson localization material configured to exhibit two-dimensional transverse Anderson localization of light from the array of pixels 44.

Layer 40 may be formed over the image transport layer and may have a curved inner surface 78 and a curved outer surface 80. Without modifying the image data displayed by display layer 42, the perceived output surface of the display may be the same as the actual output surface 82 of image transport layer 74. The image data displayed by display layer 42 may instead be modified so that the perceived output surface of the display is surface 100 (e.g., a surface with curvature that matches the curvature of the inner surface 78 of layer 40 and/or the outer surface 80 of layer 40). In yet another embodiment, the image data displayed by display layer 42 may be modified so that the perceived output surface of the display is planar (and the curvature of the edge of the display is not perceived by the viewer). In this scenario, the perceived output surface may be parallel to display layer 42, for example. These examples are merely illustrative. In general, the image data displayed by display layer 42 may be modified to result in a perceived output surface of any desired curvature and location.

Figure 16:
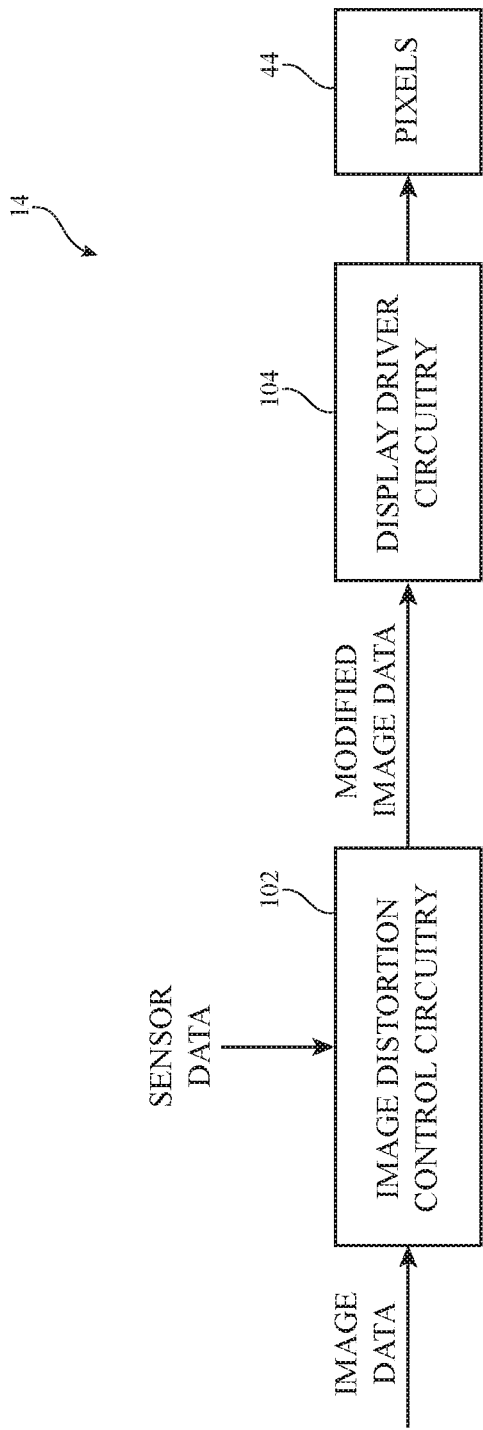
FIG. 16 is a schematic diagram of an illustrative display that modifies image data to control perceived distortion in accordance with an embodiment.

In order to control the perceived distortion of the display by a viewer, the display pixel data may be selectively modified. FIG. 16 shows a schematic diagram of illustrative circuitry that may be used in implementing display 14 of device 10. During operation of electronic device 10, control circuitry (e.g., control circuitry 20 in FIG. 1) in the device may supply image data for images to be displayed on display 14. Ultimately, the image data may be delivered to display driver circuitry 104, which may supply the image data to data lines of the display. Display driver circuitry 104 may also include gate driver circuitry which is used to assert gate line signals on gate lines of display 14. The display driver circuitry may be used to provide the image data to the pixels 44 in the display.

Before being provided to display driver circuitry 104, the image data may be modified by image distortion control circuitry 102. Each frame of image data may include a representative brightness value for each pixel 44. Image distortion control circuitry 102 may modify the brightness value for each pixel based on a desired perceived distortion by the viewer. Image distortion control circuitry 102 may modify the brightness value for all pixels in the display based on a desired perceived distortion or may only modify some of the pixels in the display (e.g., edge and/or corner pixels) based on a desired perceived distortion. For example, the display may have different distortion modes (sometimes referred to as distortion settings) and the image data may be modified based on the present distortion mode. In another example, each edge of the display may have a respective distortion mode and the image data for that edge may be modified based on the particular distortion mode. These examples are merely illustrative. In general, the perceived distortion of every portion of the display may be controlled individually.

The image distortion control circuitry 102 may modify the image data based both on the desired perceived distortion (e.g., the distortion setting) and sensor data from one or more sensors within the electronic device (e.g., sensors 16 in FIG. 1). Image distortion control circuitry 102 may receive sensor data from force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), depth sensors (e.g., structured light sensors and/or depth sensors based on stereo imaging devices), optical sensors such as self-mixing sensors and light detection and ranging (lidar) sensors that gather time-of-flight measurements, gaze tracking sensors, and/or other sensors. In one illustrative example, the sensor data may be used to identify the current location of the viewer (e.g., the current location of the viewer's eyes) of the display. The image distortion control circuitry may then modify the image data to ensure the perceived distortion matches the desired perceived distortion for a viewer at the current location.

After the image data is modified by image distortion control circuitry 102, the modified image data (sometimes referred to as compensated image data) may be provided to display driver circuitry 104. Display driver circuitry 104 will then provide the modified image data to the pixels 44. The pixels then display the desired image with the desired perceived distortion to the viewer.

Image distortion control circuitry 102, display circuitry 104, and pixels 44 as shown in FIG. 16 may sometimes be collectively referred to as display circuitry. Alternatively, pixels 44 may sometimes be referred to as a display while image distortion control circuitry 102 and display driver circuitry 104 may sometimes collectively be referred to as control circuitry.

Figure 17:
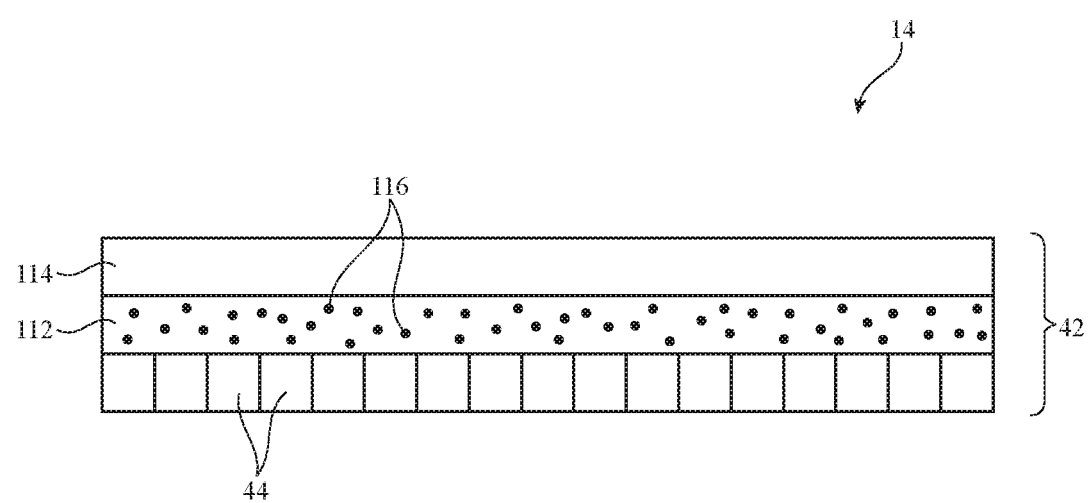
FIG. 17 is a cross-sectional side view of an illustrative display with light scattering particles formed in an encapsulation layer above the display pixels in accordance with an embodiment.

To increase the viewing angle of the display, light scattering particles may be embedded in one of the display layers 42. FIG. 17 is a cross-sectional side view of an illustrative display with light scattering particles. As shown in FIG. 17, an encapsulation layer 112 may be formed over display pixels 44. For example, display pixels 44 may be organic light-emitting diode (OLED) display pixels and encapsulation layer 112 may be a polymer planarization layer over the OLED display pixels. To help increase the viewing angle of the display, light scattering particles 116 may be embedded in encapsulation layer 112. The light scattering particles may be nanoparticles. For example, the light scattering particles may have at least one dimension of less than 100 nanometers, less than 10 nanometers, less than 1 nanometer, between 1 and 100 nanometers, etc. By scattering the light emitted by pixels 44, the light scattering particles 116 increase the viewing angle of display 14. Display 14 may also include a circular polarizer such as circular polarizer 114. Circular polarizer 114 may suppress ambient light reflections (e.g., ambient light reflections off of light scattering particles 116 and off of reflective components in pixels 44).

The example of pixels 44 in FIG. 17 being OLED pixels is merely illustrative. If desired, pixels 44 may be liquid crystal display pixels or any other desired type of pixels. Also, light scattering particles 116 may be formed in encapsulation layer 112 or any other desired layer within the display. The light scattering particles 116 may be used in a display that does not have an image transport layer. Alternatively, the light scattering particles 116 may be used in a display that does have an image transport layer. The light scattering particles may be interposed between the pixels and the image transport layer. Instead or in addition, a diffusive layer (that also may include light scattering particles) may be formed on the output side of the image transport layer as discussed in connection with FIG. 8.

The foregoing is merely illustrative and various modifications can be made to the described embodiments. The foregoing embodiments may be implemented individually or in any combination.

What is claimed is:

1. An electronic device comprising:
a planar display panel having an array of pixels;
an image transport layer having an input surface that receives light from the array of pixels and an output surface, wherein the image transport layer comprises a plurality of fibers that form a region of the image transport layer in which the output surface has a curved profile, and wherein each fiber of the plurality of fibers has a respective output face that is parallel to the planar display panel;
a display cover layer that covers the image transport layer; and
diffusive material interposed between the display cover layer and the image transport layer.

2. The electronic device defined in claim 1, wherein the fibers of the plurality of fibers have different lengths to form the curved profile.

3. The electronic device defined in claim 1, wherein the region with the curved profile is formed along an edge of the image transport layer and wherein the image transport layer has a central portion that includes an additional plurality of fibers.

4. The electronic device defined in claim 1, further comprising:
optically clear adhesive interposed between the display cover layer and the image transport layer.

5. The electronic device defined in claim 1, further comprising:
an adjustable opacity layer interposed between the display cover layer and the image transport layer.

6. The electronic device defined in claim 1, wherein the display cover layer has an inner surface with a curved portion that overlaps the region of the image transport layer in which the output surface has the curved profile.

7. The electronic device defined in claim 6, wherein the curved portion of the inner surface of the display cover layer has an additional curved profile that is the same as the curved profile.

8. The electronic device defined in claim 6, wherein the curved portion of the inner surface of the display cover layer has an additional curved profile that is different than the curved profile.

9. The electronic device defined in claim 8, further comprising:
image distortion control circuitry that modifies image data based on a perceived distortion setting; and
display driver circuitry that provides the modified image data to the array of pixels.

10. An electronic device having an edge, the electronic device comprising:
a display panel having an array of pixels;
an image transport layer having an input surface that receives light from the array of pixels and an output surface, wherein the image transport layer comprises a plurality of fibers that form a region of the image transport layer along the edge in which the output surface has a curved profile, and wherein each fiber of the plurality of fibers has a respective output face that is angled away from the edge; and
a display cover layer that covers the image transport layer.

11. The electronic device defined in claim 10, wherein the fibers of the plurality of fibers have different lengths to form the curved profile.

12. The electronic device defined in claim 10, wherein the image transport layer has a central portion that includes an additional plurality of fibers and wherein each fiber of the additional plurality of fibers has a respective output face that is parallel to the display panel.

13. The electronic device defined in claim 12, wherein the fibers of the additional plurality of fibers are all the same length.

14. The electronic device defined in claim 10, further comprising:
diffusive material interposed between the display cover layer and the image transport layer.

15. The electronic device defined in claim 10, wherein the display cover layer has an inner surface with a curved portion along the edge that overlaps the region of the image transport layer in which the output surface has the curved profile.

16. An electronic device comprising:
a display panel having an array of pixels;
an image transport layer having an input surface that receives light from the array of pixels and an output surface that includes a region with a first curved profile;
a display cover layer that has an inner surface with a second curved profile that has different curvature than the first curved profile;
image distortion control circuitry configured to modify image data based on a selected perceived distortion; and
display driver circuitry configured to provide the modified image data to the array of pixels.

17. The electronic device defined in claim 16, wherein the image transport layer comprises a coherent fiber bundle.

18. The electronic device defined in claim 16, wherein the image transport layer comprises a layer of Anderson localization material configured to exhibit two-dimensional transverse Anderson localization of light from the array of pixels.

19. The electronic device defined in claim 16, further comprising:
a sensor configured to gather sensor data, wherein the image distortion control circuitry is configured to modify the image data based on both the selected perceived distortion and the sensor data.

* * * * *